(12) United States Patent
O'Keefe et al.

(10) Patent No.: US 11,265,526 B2
(45) Date of Patent: *Mar. 1, 2022

(54) METHODS FOR AUTOMATIC REGISTRATION OF 3D IMAGE DATA

(71) Applicant: Occipital, Inc., Boulder, CO (US)

(72) Inventors: Patrick O'Keefe, San Francisco, CA (US); Jeffrey Roger Powers, San Francisco, CA (US); Nicolas Burrus, Madrid (ES)

(73) Assignee: Occipital, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,350

(22) Filed: Jul. 27, 2020

(65) Prior Publication Data

US 2020/0358997 A1 Nov. 12, 2020

Related U.S. Application Data

(63) Continuation of application No. 16/514,225, filed on Jul. 17, 2019, now Pat. No. 10,750,150, which is a
(Continued)

(51) Int. Cl.
*H04N 13/122* (2018.01)
*G06K 9/00* (2006.01)
(Continued)

(52) U.S. Cl.
CPC ......... *H04N 13/122* (2018.05); *G06K 9/0063* (2013.01); *G06K 9/00201* (2013.01); *G06T 7/337* (2017.01); *H04N 13/128* (2018.05); *H04N 13/239* (2018.05); *H04N 13/246* (2018.05); *H04N 13/25* (2018.05); *H04N 13/261* (2018.05); *H04N 13/271* (2018.05);
(Continued)

(58) Field of Classification Search
CPC ...... G06T 7/30; G06K 9/0063; H04N 13/122; H04N 13/128
See application file for complete search history.

(56) References Cited

U.S. PATENT DOCUMENTS 8,401,242 B2 * 3/2013 Newcombe ........ G06K 9/00664
382/107
8,411,149 B2 * 4/2013 Maison .............. G06K 9/00369
348/207.1
(Continued)

OTHER PUBLICATIONS

Registration and Integration of Textured 3-D Data; Johnson et al; 1997. (Year: 1997).*
(Continued)

*Primary Examiner* — Luis Perez-Fuentes
(74) *Attorney, Agent, or Firm* — Lee & Hayes, P.C.

(57) ABSTRACT

A method for automatic registration of 3D image data, captured by a 3D image capture system having an RGB camera and a depth camera, includes capturing 2D image data with the RGB camera at a first pose; capturing depth data with the depth camera at the first pose; performing an initial registration of the RGB camera to the depth camera; capturing 2D image data with the RGB camera at a second pose; capturing depth data at the second pose; and calculating an updated registration of the RGB camera to the depth camera.

20 Claims, 5 Drawing Sheets

Related U.S. Application Data continuation of application No. 15/956,347, filed on Apr. 18, 2018, now abandoned, which is a continuation of application No. 14/716,640, filed on May 19, 2015, now abandoned.

(60) Provisional application No. 62/000,420, filed on May 19, 2014.

(51) Int. Cl.

| | |
|---|---|
| *H04N 13/261* | (2018.01) |
| *G06T 7/33* | (2017.01) |
| *H04N 13/246* | (2018.01) |
| *H04N 13/25* | (2018.01) |
| *H04N 13/239* | (2018.01) |
| *H04N 13/271* | (2018.01) |
| *H04N 13/128* | (2018.01) |
| *H04N 13/00* | (2018.01) |
| *H04N 13/257* | (2018.01) |

(52) U.S. Cl.
CPC ............... *G06T 2207/10012* (2013.01); *G06T 2207/10021* (2013.01); *G06T 2207/10024* (2013.01); *G06T 2207/10028* (2013.01); *G06T 2207/20221* (2013.01); *G06T 2207/30244* (2013.01); *H04N 13/257* (2018.05); *H04N 2013/0077* (2013.01); *H04N 2013/0081* (2013.01); *H04N 2013/0085* (2013.01)

(56) References Cited

U.S. PATENT DOCUMENTS

| | | | |
|---|---|---|---|
| 8,619,071 B2 | 12/2013 | Kopf et al. | |
| 8,711,206 B2 | 4/2014 | Newcombe et al. | |
| 9,420,265 B2 | 8/2016 | Taguchi et al. | |
| 9,924,142 B2 | 3/2018 | Ni et al. | |
| 10,452,069 B2 * | 10/2019 | Stein | G06K 9/00798 |
| 10,750,150 B2 * | 8/2020 | O'Keefe | G06K 9/0063 |
| 2005/0128196 A1 | 6/2005 | Popescu et al. | |
| 2009/0184849 A1 | 7/2009 | Nasiri et al. | |
| 2011/0080471 A1 | 4/2011 | Song et al. | |
| 2012/0082210 A1 | 4/2012 | Chien et al. | |
| 2012/0196679 A1 | 8/2012 | Newcombe et al. | |
| 2012/0306850 A1 | 12/2012 | Balan et al. | |
| 2012/0306876 A1 | 12/2012 | Shotton et al. | |
| 2014/0139639 A1 | 5/2014 | Wagner et al. | |
| 2014/0168378 A1 | 6/2014 | Hall | |
| 2014/0267631 A1 | 9/2014 | Powers et al. | |
| 2015/0243035 A1 | 8/2015 | Narasimha et al. | |
| 2015/0262412 A1 | 9/2015 | Gruber et al. | |
| 2018/0241985 A1 | 8/2018 | O'Keefe et al. | |
| 2020/0007842 A1 | 1/2020 | O'Keefe et al. | |

OTHER PUBLICATIONS

3-D Face Detection, localization, and Registration Using a Point Model; Prathap; 2009. (Year: 2009).*

Compact and Accurate 3_D Face Modeling Using an RGB_D Camera; Pavan et. al; 2013. (Year: 2013).*

Anasosalu, "Compact and Accurate 3-D Face Modeling Using an RGB-D Camera: Let's Open the Door to 3-D Video Conference", IEEE International Conference on Computer Vision Workshops, 2013, pp. 67-74.

Besl et al, "A Method for Registration of 3-D Shapes", IEEE Transactions of Pattern Analysis and Machine Intelligence, vol. 14, No. 2, Feb. 1992, pp. 239-256.

Best, et. al., "A Method for Registration of 3-D Shapes", IEEE Transaction on Pattern Analysis and Machine Intelligence, Feb. 1992, 18 pages.

Johnson et al, "Registration and Integration of Textured 3-D Data", IEEE, 1997, pp. 234-241.

Nair et al, "3-D Face Detection, Landmark Localization, and Registration Using a Point Distribution Model", IEEE Transactions on Multimedia, vol. 11, No. 4, Jun. 2009, pp. 611-623.

Office Action for U.S. Appl. No. 15/956,347, dated Nov. 30, 2018, O'Keefe et al, "Methods for Automatic Registration of 3D Image Data", 11 pages.

Office Action for U.S. Appl. No. 15/956,347, dated Apr. 29, 2019, O'Keefe, "Methods for Automatic Registration of 3D Image Data", 5 pages.

* cited by examiner

RGB Camera Frame 2
Depth Camera Frame
RGB Camera Frame 1

METHODS FOR AUTOMATIC REGISTRATION OF 3D IMAGE DATA

CROSS-REFERENCE TO RELATED APPLICATION(S)

This application is a continuation of and claims priority to U.S. application Ser. No. 16/514,225 filed on Jul. 17, 2019 and entitled "Methods for Automatic Registration of 3D Image Data," which is a continuation of claims priority to U.S. application Ser. No. 15/956,347 filed on Apr. 18, 2018 and entitled "Methods for Automatic Registration of 3D Image Data," which is a continuation of and claims priority to U.S. application Ser. No. 14/716,640, filed on May 19, 2015 and entitled "Methods for Automatic Registration of 3D Image Data," which is a non-provisional of and claims priority to Provisional Application No. 62/000,420 filed on May 19, 2014 and entitled "Methods for Automatic Registration of 3D Image Data," which are incorporated by reference herein in their entirety.

TECHNICAL FIELD

This invention relates generally to the 3D imaging field, and more specifically to new and useful methods for automatic registration of 3D image data in the 3D imaging field.

BACKGROUND

Many 3D image capture systems capture 3D image data by collecting aspects of the image data from separate sensors (e.g. an RGC camera and a depth camera) and them combining those aspects. Registering the separate sensors to each other enables the 3D image data to be properly aligned, but registration often requires that a user perform potentially frustrating manual calibration steps. Thus, there is a need in the 3D imaging field to create methods for automatic registration of 3D image data. This invention provides such new and useful methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Many 3D image capture systems capture 3D image data by capturing a 2D image with one camera (typically an RGB camera) and capturing a depth image with another camera (typically an active depth camera using a structured light or time of flight technique, but depth information may also be captured by two RGB or IR cameras using stereo techniques) and combining the two images. Since the cameras cannot physically occupy the same position at the same time, the images taken by the two cameras are slightly misaligned. Further, the cameras often have non-identical intrinsic properties (e.g. image format, focal length, lens distortion properties, principal point), which further contributes to misalignment between the two cameras. If the intrinsic properties of each camera are known, and the difference in positional and rotational (i.e. roll, pitch, and yaw) orientation between the two cameras is known, the misalignment between the two images can be corrected for; for example, by calculating a rigid body transform that transforms points in the coordinate system of one image to points in the coordinate system of the other. In many cases, these three variable sets (i.e., intrinsic properties, positional orientation, and rotational orientation) are not precisely known, requiring a calibration to be performed to identify one or more variables of the three variable sets. This calibration often requires using a calibration image (e.g., an image with a known associated metric scale), manual alignment, or other technique; in most cases, requiring user time and input. This is particularly non-ideal in cases where the three variable sets are not constant in time; for instance, in the case where one of the 3D image capture system cameras is detachable and/or replaceable. In these cases, recalibration might need to be performed whenever a variable of the three variable sets is changed. One example of a 3D image capture system with a detachable camera is the 3D image capture system of U.S. patent application Ser. No. 14/028,868, which is incorporated in its entirety by this reference.

Figure 1:
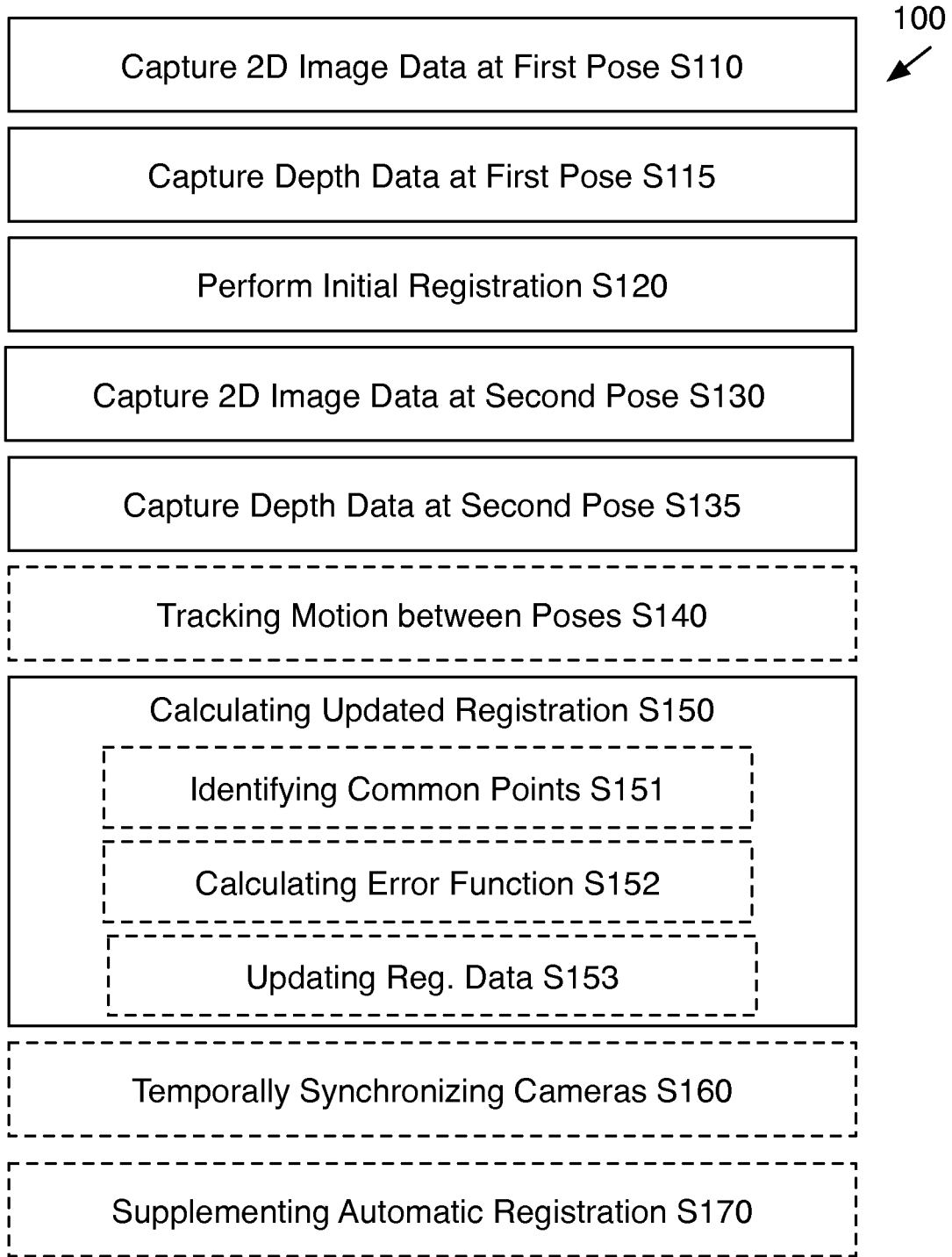
FIG. 1 is a operational block diagram of a method of a preferred embodiment.

As shown in FIG. 1, a method 100 for automatic registration of 3D image data includes, using a 3D image capture system having an RGB camera and a depth camera, capturing 2D image data with the RGB camera at a first pose S110; capturing depth data with the depth camera at the first pose S115; performing an initial registration of the RGB camera to the depth camera S120; capturing 2D image data with the RGB camera at a second pose S130; capturing depth data at the second pose S135; and calculating an updated registration of the RGB camera to the depth camera S150. The method 100 may additionally or alternatively include tracking motion of the 3D image capture system between the first and second poses S140, temporally synchronizing the RGB camera to the depth camera S160, and/or supplementing automatic registration S170.

The method 100 functions to perform automatic or partially automatic registration of an RGB camera to a depth camera in a 3D image capture system. The 3D image capture system is preferably the 3D image capture system of U.S. patent application Ser. No. 14/028,868 but may additionally or alternatively be any other suitable 3D image capture system. The 3D image capture system preferably includes an RGB camera and a depth camera but may additionally or alternatively include any suitable 3D image capture sensors. The RGB camera functions to capture 2D image data of an imaging target; specifically, color and/or texture data of an imaging target. Color data preferably includes data describing the color of the 2D image data (e.g. RGB values at each pixel) but may additionally or alternatively include any other suitable visual data such as infrared image data. Texture data preferably includes data describing the perceived surface quality of 2D image data (e.g. how intensity and/or color data change across pixels of 2D image data) but may additionally or alternatively include any other suitable texture data. The RGB camera may be supplemented by or be substituted for by any other camera or imaging device capable of providing color and/or texture data of an imaging target; for instance, the RGB camera may be replaced by a monochrome visible light camera or an infrared camera. The depth camera may be supplemented by or be substituted for by any other suitable source of depth map data; for instance, the depth camera may be replaced by a LIDAR sensor. The depth camera may be any suitable type of depth camera, such as a time of flight camera, a structured light camera, a stereo camera system, or an assisted stereo camera system (e.g., a structured light assisted stereo camera system). The 3D image capture system may additionally or alternatively include an inertial measurement unit (IMU) or other motion or position sensor. The method is preferably applied to a 3D image capture system with the RGB camera offset from the depth camera such that the RGB camera and the depth camera do not share a common viewpoint on the device. Note that for depth camera systems having multiple cameras (e.g., a stereo depth camera), the "viewpoint" of the depth camera may either be represented by individual viewpoints for each camera of the depth camera system or by a composite viewpoint (e.g., the midpoint of the line between two cameras of a stereo depth camera or any other point of calibration for the depth camera system). For example, the RGB camera may include a viewpoint through a lens on the upper right corner, while the depth camera has a viewpoint offset by 0.5 in. to 6 inches.

The method 100 preferably enables fully or partially automatic registration by comparing the color and/or texture of one or more three-dimensional locations imaged at one pose to the color and/or texture of those same locations imaged at another pose. The color and/or texture of the locations do not generally change dramatically when viewed from different poses, so by minimizing (or reducing below a threshold) the difference in color and/or texture between the two poses the correct transformation between the 2D image data and the depth data can be found.

Figure 2:
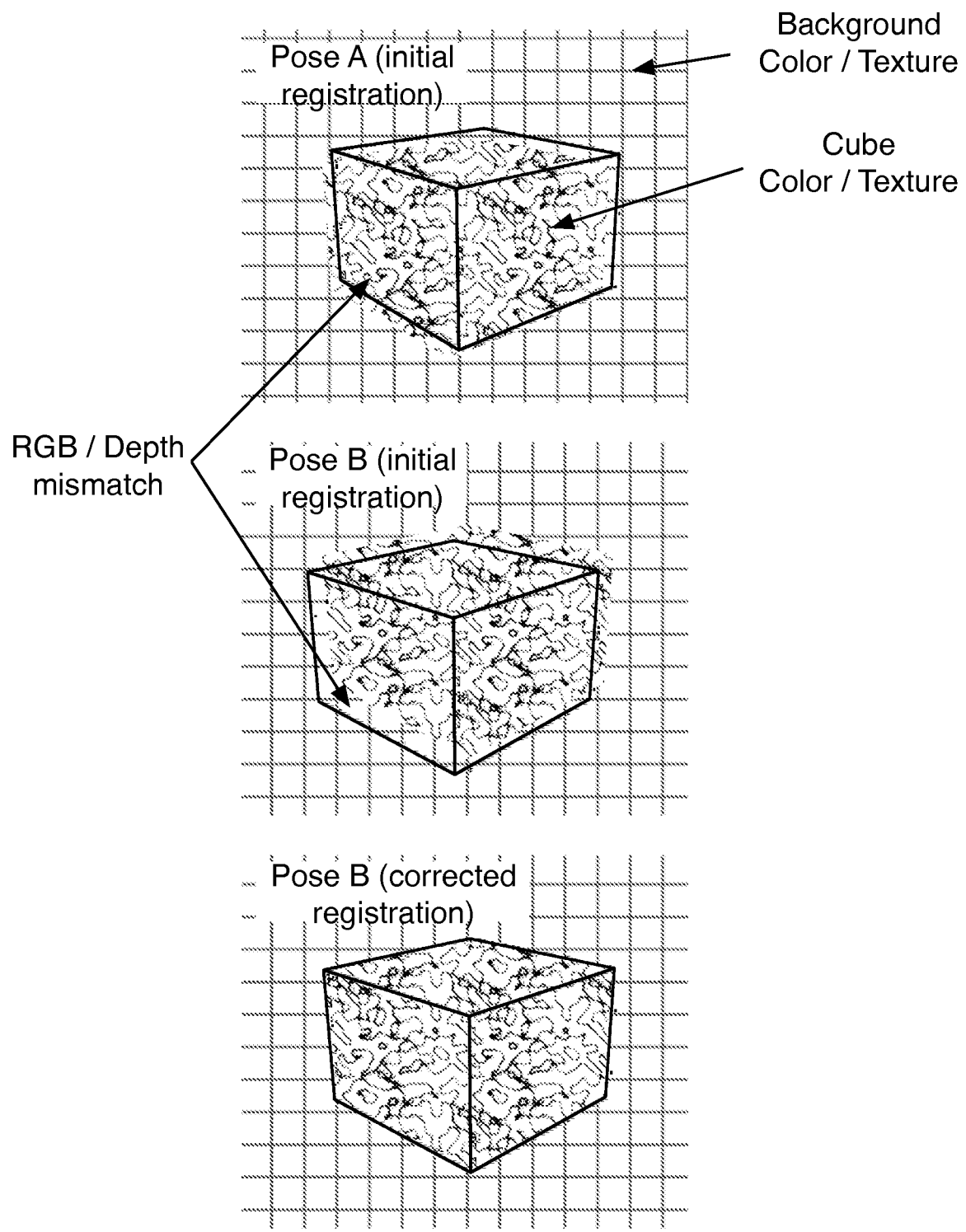
FIG. 2 is an example diagram view of image data captured using a method of a preferred embodiment.

In an exemplary instance of the method, the 3D image capture system first captures a 2D image of a cube of one color/texture against a background of a different color/texture and a depth image of the same scene, at a first pose (Pose A). Using an initial registration, the 3D image capture system combines the 2D image and depth image to produce a 3D image. As shown in FIG. 2, a profile of the cube is detected by the depth image (as represented by the dark outline of the cube overlaid atop the 2D image). Because the initial registration is not accurate, some of the background color/texture is projected onto the part of the depth image corresponding to the cube and vice versa. The 3D image capture system is then moved to a second pose (Pose B). Using the same registration, Pose B also has some of the background color/texture projected onto the part of the depth image corresponding to the cube and vice versa, but now the overlapping areas are different as a result of the registration errors being applied at a new image pose. A consequence of this is that the color/texture of some parts of the cube as imaged by the depth image (and likewise some parts of the background) have changed. This mismatch between the colors/textures linked to coordinates of the depth image at Pose A and the colors/textures linked to the same coordinates of the depth image at Pose B can be used to correct the registration of the RGB camera to the depth camera and thus correct mismatch between the 2D image and the depth image.

Step S110 includes capturing 2D image data with the RGB camera at a first pose. Step S110 functions to obtain initial 2D image data to be used with the method 100. The 2D image data is preferably an RGB image but may additionally or alternatively be any other suitable form of 2D image data. The 2D image data may be captured as a still image or as a video stream.

Step S115 includes capturing depth data with the depth camera at the first pose. Step S115 functions to obtain initial depth data to be used with the method 100. The depth data is preferably a depth map but may additionally or alternatively be any other suitable form of depth data. Depth data may additionally or alternatively include images (e.g., visible images, infrared images) produced by a depth camera or depth camera system. Depth data is preferably captured with the depth camera using a structured light technique or a time-of-flight technique, but may additionally or alternative be captured using any suitable technique, such as stereo or assisted stereo techniques. The depth map can be a static capture or a depth video stream.

In an alternative embodiment, the depth data may be captured by a source other than the depth camera; for instance, if the first pose is known, a previously captured (or previously generated) depth map of the scene may be used to capture the depth data. Step S115 is preferably performed at the same time as Step S110, but may additionally or alternatively be performed at any other suitable time. Step S115 and S110 are preferably performed during live operation of a device but may alternatively be captured and stored.

Step S120 includes performing an initial registration of the RGB camera to the depth camera. Step S120 functions to provide an initial estimate of the link between image coordinates of the RGB camera and image coordinates of the depth camera (or, in the case of a depth camera system including more than one camera, the image coordinates of the depth map created by the depth camera system).

Step S120 preferably includes calculating an initial registration from initial values of intrinsic RGB camera properties, initial values of intrinsic depth camera properties, and an initial difference in positional and rotational orientation between the RGB and depth camera or depth camera system. Preferably, the values of the intrinsic RGB and depth camera properties are known (and so initial values are assumed to be final values) and the initial difference in positional and rotational orientation between the RGB and depth cameras is an estimate. Additionally or alternatively, any of the values may be either known or estimated. Values may additionally be partially estimated; for example, the difference in roll, pitch, yaw, and z coordinates between the RGB and depth camera may be known, while the difference in x and y coordinates may be estimated. Step S120 may additionally or alternatively include receiving data on one or more of the intrinsic depth camera properties, the intrinsic RGB camera properties, or the difference in positional and rotational orientation between the RGB and depth cameras. Data may be received from any suitable source, for instance, if a model number of a camera is known, intrinsic properties may be looked up by consulting a datasheet or database containing intrinsic properties linked to camera model number. As another example, if registration has been performed in the past with a specific camera, it may be assumed that the intrinsic properties of that camera are the same as determined in the previous registration.

Step S120 may additionally or alternatively include performing an initial registration of the RGB camera to the depth camera in any other suitable manner. For example, a 3D image capture system may have a default initial registration that is always used as a starting point, in this case, performing the initial registration would simply involve applying the default initial registration. As another example, the initial registration may be determined (either fully or in part) in combination with other techniques by image feature detection. In this case, the 3D image capture system might try to identify features shared in both the 2D image data and the depth image data; for example, object edges or patches. From the identified features, the 3D image capture system could calculate a registration that would align the identified features in both the 2D image data and the depth image data. In the case of object patches, this might involve the use of the PatchMatch algorithm.

Step S120 is preferably performed by the 3D image capture system while capturing 3D image data but may additionally or alternatively be performed at any suitable time on any suitable computing system. For instance, Step S120 might be performed on data taken the previous week to aid in correcting errors in the alignment between the 2D image data and the depth data; in this case Step S120 might also be performed by a laptop computer while viewing the 3D image data. As another example, Step S120 might be performed fully or partially via cloud computing.

Step S130 includes capturing 2D image data with the RGB camera at a second pose. Step S130 functions to obtain additional 2D image data at a second instance to be used with the method 100. The 2D image data is preferably an RGB image but may additionally or alternatively be any other suitable form of 2D image data. The 2D image data is preferably captured in a manner substantially similar to that of step S110. The second instance may occur in response to the periodic capture of 2D image data and depth data. The second instance may additionally or alternatively be an event triggered through detected motion of the 3D image capture system. The second instance may additionally or alternatively be detected from change in image data, or from any other suitable event.

Step S135 includes capturing depth data at the second pose. Step S135 functions to obtain additional depth data of a second instance to be used with the method 100. The depth data is preferably a depth map but may additionally or alternatively be any other suitable form of depth data. Step S135 is preferably performed at the same time as Step S130, but may additionally or alternatively be performed at any other suitable time.

Step S135 preferably includes capturing depth data using the depth camera or depth camera system of the 3D image capture system, but may additionally or alternatively include capturing depth data in any other suitable manner. For example, depth data may be captured from pre-existing 3D image data (e.g. a generated model or pre-captured 3D image data). As another example, depth data may be captured using derived data techniques similar to those described in U.S. patent application Ser. No. 14/216,010, which is incorporated in its entirety by this reference. Derived data techniques preferably include any techniques wherein depth data is derived from the pose (or motion) of the 3D image capture system and reference 3D image data. For example, the 3D image capture system captures a first frame of depth data at some time to and some pose po. The 3D image capture system then tracks the motion of the 3D image capture system through a three-dimensional space (e.g., egomotion, as in Step S140) from time to time t1 (and from pose po to pose p1). Using the first frame of depth data taken at time to and pose po and the tracked egomotion the 3D image capture system can derive depth data at time t1 and pose p1. The capability to derive depth data from 3D image capture system motion data allows for depth data to be captured at times and/or positions where the depth camera has not performed imaging.

Derived data techniques can operate on any suitable source of reference 3D image data (including artificially generated 3D models) and any suitable source of 3D image capture system motion or pose data. Derived data techniques may derive depth from these inputs using any suitable algorithm or combination of algorithms.

Step S140 includes tracking motion of the 3D image capture system between the first and second poses. Motion of the 3D image capture system is preferably tracked through a three-dimensional space (e.g., egomotion) or relative to a reference in a three-dimensional space. Tracking motion likewise enables tracking the pose of the 3D image capture system relative to an initial pose. Tracking motion may include using 3D image-based motion tracking techniques, 2D image-based motion tracking techniques, motion sensor data-based motion tracking techniques, and/or any other suitable motion tracking techniques. Some example 3D image-based motion tracking techniques include iterative closest point (ICP), perspective-n-point (PnP), and direct methods using dense image warping. Some example 2D image-based motion tracking techniques include utilizing the N-point algorithms that recover the essential or fundamental matrix, solving the structure from motion problem, or solving a nonlinear cost function for the motion by considering the reprojection error between two frames.

Combinations of these tracking techniques can be used to achieve some of the benefits of 3D image-based motion tracking techniques without requiring a continuous stream of 3D image data. For example, a PnP algorithm can continue to be used on 2D image data given the 3D locations of visual features that were acquired the last time 3D image data was taken. In the minimal case for PnP, tracking can continue with a single passive camera as long as three visual features are still visible. As another example, using a 5-point visual odometry algorithm, motion can be tracked by propagating scale originally acquired from captured 3D image data.

As a third example, tracking motion may include using pose data from an IMU sensor as an initial estimate of the current pose of the 3D image capture system. 2D image data from an RGB camera of the 3D image capture system can be warped relative to a reference frame of 3D image data. Methods to generate reference frames may include keyframing, where one or several previous 3D image data can be reused as long as they overlap with the current 2D image data. Methods to generate reference frames may also include 3D projection of the current map representation, such as mesh rendering, ray casting from voxel presentation and surfels projection, or any other suitable reference frame generation method. The 3D image capture system then refines the pose estimate by minimizing the error between the reference frame and warped 2D image data.

A related technique utilizes sparse features (e.g., SIFT, SURF, ORB) identified from the 2D image data instead of directly utilizing the 2D image data. Sparse features are also generated for the reference frame, and may be warped to the initial estimate of the current pose, or directly matched to the features identified from the 2D image data using visual descriptors. The 3D image capture system then refines the pose estimate by minimizing the error between the warped reference frame sparse features and the sparse features identified from the 2D image data. Other related techniques may utilize RGB residuals, for example by identifying sparse features only in the reference frame and minimizing the RGB difference between the warped reference frame sparse features and their corresponding location in the 2D image data.

Other examples of tracking motion with a single passive camera involve using standard computer vision techniques for estimating motion from a single camera. With a single camera, these methods share the disadvantage that metric scale is unknown. However, with the use of 3D image data mentioned above, metric scale is known. In some cases, data from an IMU or other motion sensor could be additionally or alternatively used to determine metric scale. When 3D image data is no longer being captured, the algorithms can propagate the metric scale through several iterations or frames, continuing the motion tracking process. 3D image data may be periodically or selectively be captured to ensure a metric scale is properly being maintained.

Step S150 includes calculating an updated registration of the RGB camera to the depth camera. Calculating an updated registration preferably includes identifying a set of points common to the depth data of the first pose and the depth data of the second pose S151; calculating a color/texture error function for the set of points S152; and updating registration data to reduce the color/texture error function S153. Calculating an updated registration may additionally or alternatively include any other suitable methods of reducing misalignment between the image of the RGB camera and the image of the depth camera.

Step S151 includes identifying a set of points common to the depth data of the first pose and the depth data of the second pose. Common points represent the parts of the depth data of the second pose that are also present in the depth data of the first pose; in other words, the points have been imaged twice, but from different poses. Since color and/or texture are often substantially invariant to changes in pose, this set of common points can be used to help calculate the updated registration. The set of common points is preferably identified using an iterative closest point (ICP) algorithm, but may additionally or alternatively be identified by applying a rigid body transform calculated using pose/motion data captured in S140 or through any other suitable method.

Step S152 includes calculating a color/texture error function for the set of points. The depth data of the first and second poses are linked to the 2D image data of the first and second poses by the registration of the depth camera (or depth camera system) to the RGB camera. Thus, a set of points common to the 2D image data of the first and second poses can be calculated by the set of points common to the depth data of the first and second poses and the registration data. The color/texture error function preferably relates to the difference in color and/or texture data between the 2D image data of the first pose and the 2D image data of the second pose at the set of points common to the 2D image data of the first and second poses. The color/texture error function is preferably a mean squared error function calculated based on the RGB values at each of the set of common points, but may additionally or alternatively be any suitable function.

Step S153 includes updating registration data to reduce the color/texture error function. The value of the color/texture error function being reduced is preferably a sign of improving registration between the RGB camera and the depth camera. The color/texture error function is preferably modified by modifying any of the parameters of the registration between the RGB camera and the depth camera (e.g. the intrinsic properties of either camera and/or the difference in positional/rotational orientation between the two cameras). The color/texture error function may be reduced by modifying the parameters of registration in a number of ways. For example, the color/texture error function may be reduced by calculating the color/texture error function across all parameters in some parameter space and picking the lowest value. As another example, the color/texture error function may be reduced via iterative linearization. At each iteration, the direction in which parameters should change to reduce the color/texture error function is predicted. Each parameter is preferably tuned to result in a local minimum of the color/texture error function. Some parameters of registration may be weighted or bounded according to suitable data; for instance, the 3D image capture system may operate under the assumption that the intrinsic camera properties of the RGB camera are within 1% of specified values. Rules for weighting and bounding may be preset, may be determined through use of autoregistration methods, or may be determined through any other suitable method.

Step S150 may additionally or alternatively be performed using 2D image data and depth data taken at more than two poses. This may include attempting to reduce a color/texture error function taken across more than two poses and/or reducing the color/texture error function iteratively across sets of poses (e.g. using the results from one set of poses as the input for the next set of poses).

Step S150 may also function to refine motion tracked by Step S140 (e.g., in a fully joint optimization of all registration parameters simultaneously).

In a variation of a preferred embodiment, Step S150 may include calculating an updated registration of the RGB camera to the depth camera by using image data produced by the depth map. This technique may be used in any depth camera that produces image data as well as depth data; the technique relies on knowledge of the transformation between image data produced by the depth camera and the depth map produced by the depth camera (in some cases, the depth camera image and depth map may even share the same viewpoint). For example, an assisted stereo depth camera system with infrared cameras is capable of producing infrared images that may be aligned to images of the RGB camera.

In this variation, Step S150 preferably includes identifying a set of points common to an RGB camera frame and a depth camera frame (preferably taken at the same time). The set of points common to the RGB camera frame and the depth camera frame are preferably determined using sparse feature techniques (e.g., SIFT, SURF, ORB), but may additionally or alternatively be determined in any suitable manner.

After identification of common points, Step S150 preferably includes calculating the transformation (e.g., scaling, rotation, skewing, translation, etc.) between the RGB camera image and the depth camera image. This transformation may be used to calculate updated registration parameters. If the viewpoint of the depth map and depth camera image are not the same, Step S150 may additionally account for the transformation between the two (which is preferably known, but may additionally or alternatively be calculated by the method 100).

Step S150 is preferably performed by the 3D image capture system while capturing 3D image data but may additionally or alternatively be performed at any suitable time on any suitable computing system. For instance, Step S150 might be performed on data taken the previous week to aid in correcting errors in the alignment between the 2D image data and the depth data; in this case, Step S150 might also be performed by a laptop computer while viewing the 3D image data. As another example, Step S150 might be performed fully or partially via cloud computing.

Figure 3:
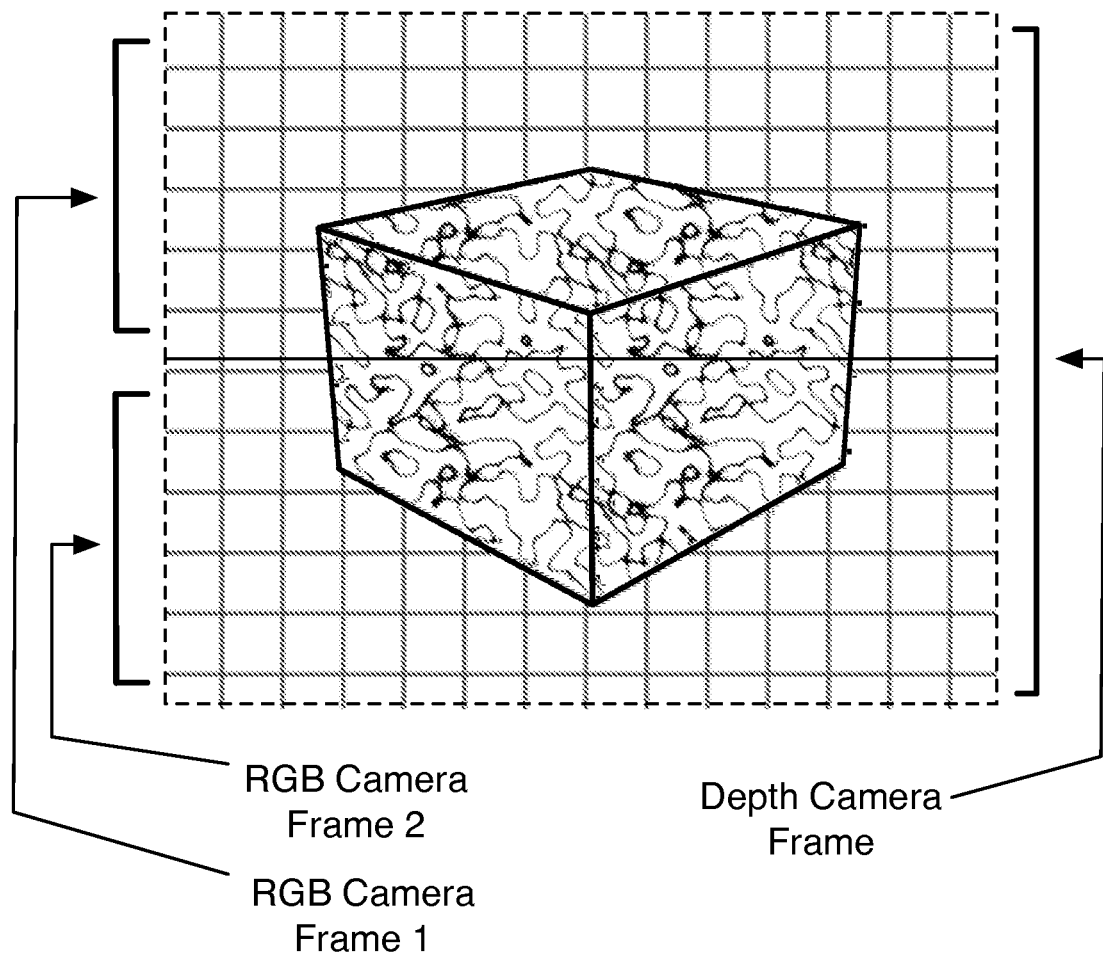
FIG. 3 is a diagram view of a temporal synchronization of a method of a preferred embodiment.

Step S160 includes temporally synchronizing the RGB camera to the depth camera. Step S160 functions to ensure that the RGB camera and the depth camera capture the imaging target at the same time for each pose. Temporally synchronizing the RGB camera and the depth camera preferably includes synchronizing the cameras such that each frame of the image taken by one camera is captured at substantially the same time as each frame of the image taken by the other camera (in depth camera systems, this might include synchronizing all cameras of the depth camera to the RGB camera). Additionally or alternatively, temporally synchronizing the RGB camera and depth camera may include any other suitable method of temporal synchronization. As a first example, temporal synchronization may include timing the RGB camera capture and depth camera capture relative to each other (that is, they do not necessarily have to occur at the same time). In this example, the known difference in timing could be used to adjust for movement between frames. More specifically, if the 3D image capture system captures an RGB image at time t0 and a depth map image at time t1; IMU data from the 3D image capture system could be used to slightly modify the depth image at time t1 to account for movement between time t0 and t1. As a second example, temporal synchronization may include taking four RGB camera frames for every one depth camera frame; when the registration process occurs, the four RGB camera frames might be combined in some way (e.g., averaged) for purposes of analysis or registration. As a third example (as shown in FIG. 3), if the depth camera has a rolling shutter (e.g. the image is captured row by row) and the RGB camera is capable of capturing two frames for each one of the depth camera's frames, the RGB camera might selectively capture image data on the part of the image currently being captured by the depth camera. For instance, the first frame of the RGB camera might capture the top half of the area being imaged by the depth camera, while the second frame of the RGB camera might capture the bottom half of the area being imaged by the depth camera.

The 3D image capture system preferably temporally synchronizes the RGB camera to the depth camera by sending a clock or other timing signal to both cameras, but may additionally or alternatively synchronize the cameras in any suitable manner. The parameters of synchronization (for instance, how many frames of one camera are taken for each of the other, or how often frames are captured) are preferably capable of being altered in response to environmental conditions or other conditions. For instance, an RGB camera might take two frames for each of the depth camera's frames in high light conditions, but only one frame for each of the depth camera's frames in low light conditions.

Figure 4:
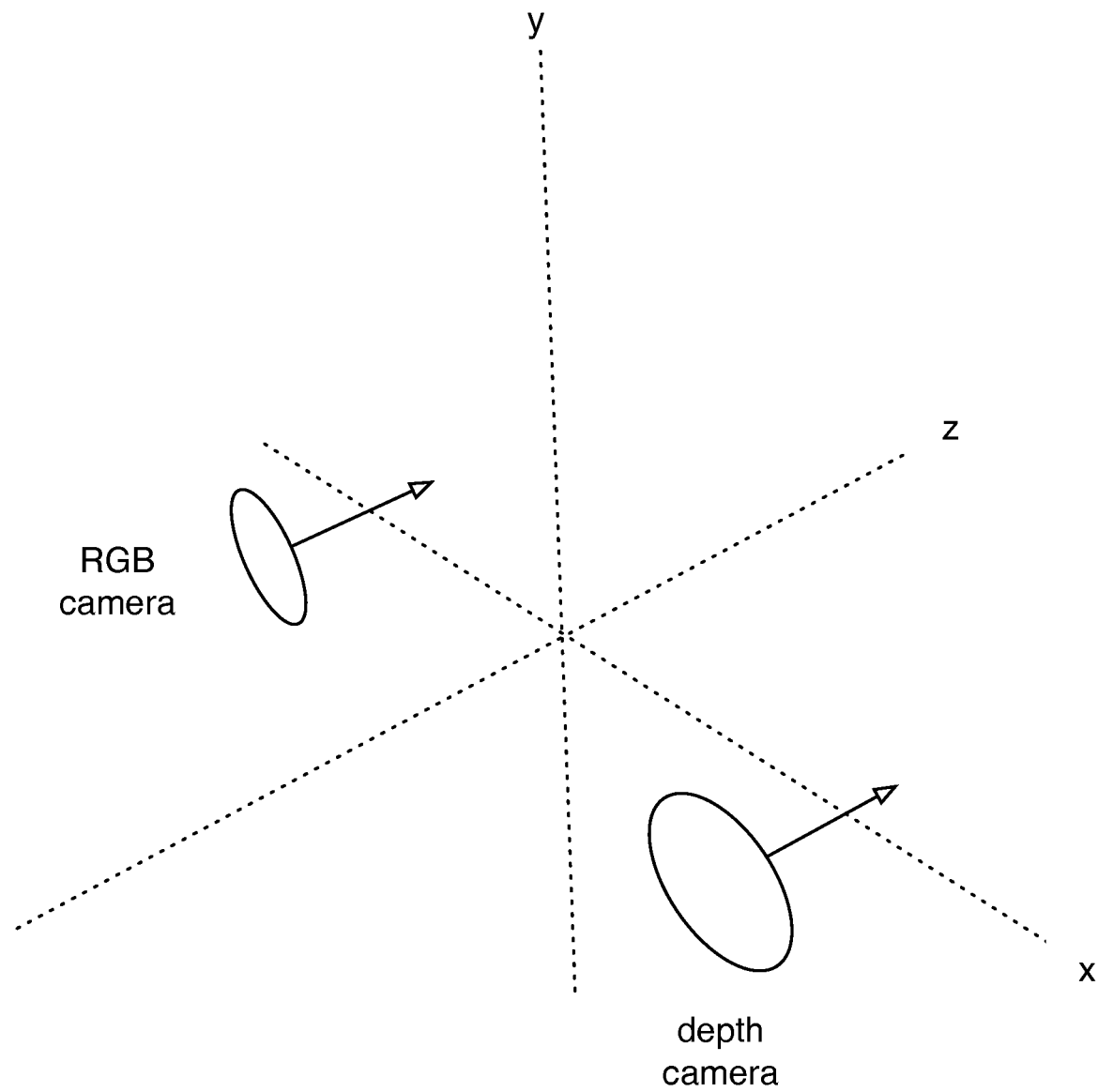
FIG. 4 is a perspective view of a coordinate system including a depth camera and an RGB camera.

Step S170 includes supplementing automatic registration. As previously discussed, the method 100 may enable partially or fully automatic registration of the RGB camera to the depth camera (or depth camera system). In some circumstances, the primary autoregistration techniques used in the method 100 may not lead to satisfactory autoregistration results for all parameters. For example, in a system in which an RGB camera and a depth camera are arranged as shown in FIG. 4, it may be more difficult to estimate registration parameters corresponding to differences in rotation around the y axis than those corresponding to the other rotations and displacements. Difficulty here might correspond to decreased solution accuracy and/or to increased computational or frame sample number requirements.

In a first embodiment, Step S170 includes supplementing the primary autoregistration technique used by the method 100 with a secondary autoregistration technique (e.g., edge alignment). This may be useful if a particular autoregistration technique is more efficient at calculating a subset of autoregistration parameters than the primary autoregistration technique. This may also be useful in certain environmental scenarios (e.g., one autoregistration technique may be more effective in low light conditions, while another may be more effective in full daylight).

In a second embodiment, Step S170 includes supplementing the primary autoregistration technique with a manual or partially manual calibration technique. In this embodiment, user interaction is used to fully or partially determine one or more registration parameters (e.g., parameters corresponding to intrinsic, positional, or rotational differences between RGB and depth cameras).

Figure 5:
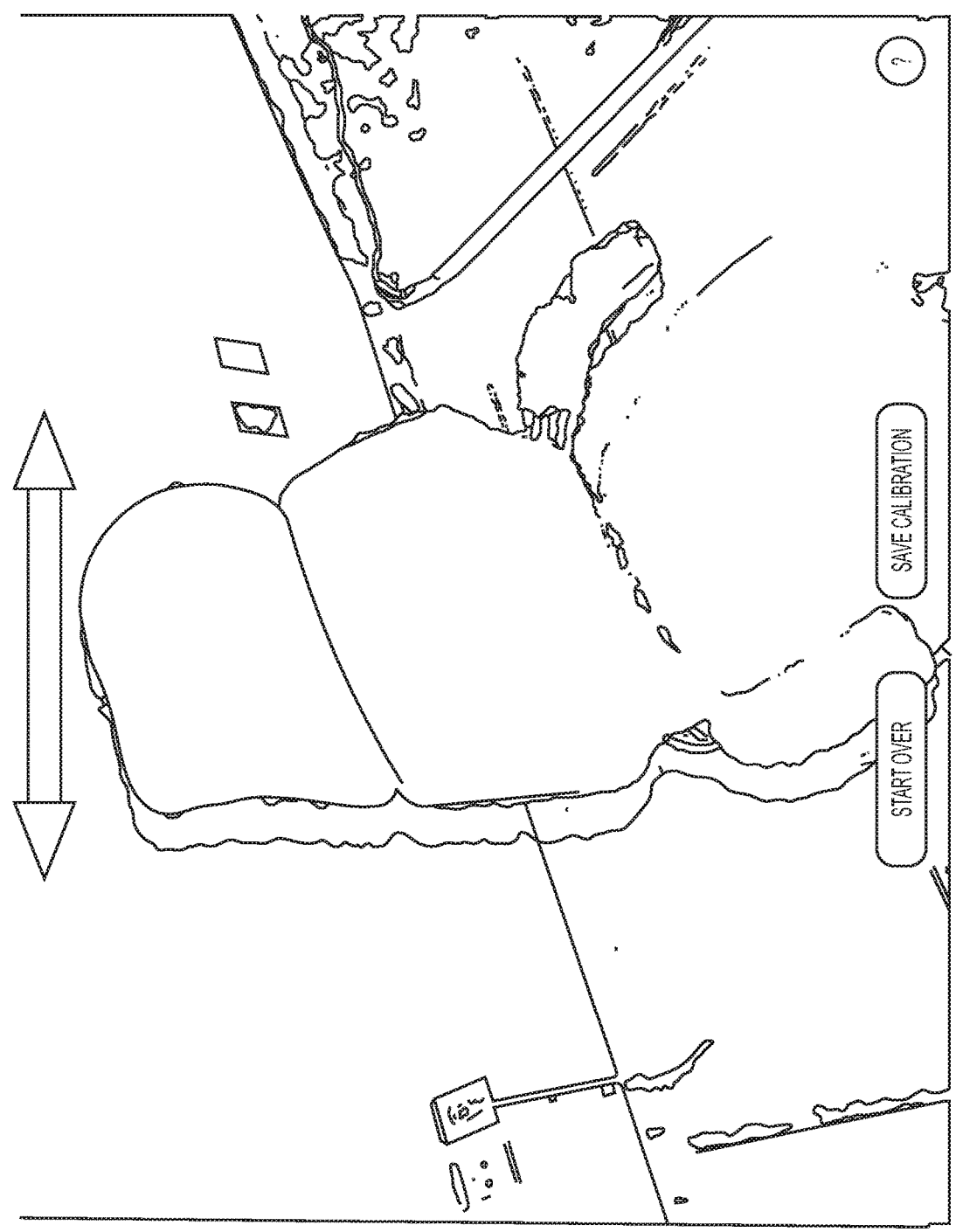
FIG. 5 is an example view of user alignment of an RGB image and a depth map overlay.

User interaction may be used to aid in determining registration parameters in any suitable manner; for example, a user may simply input a value corresponding to a desired registration parameter. Preferably, though, users aid in setting registration parameters by visually aligning depth and RGB images; for example, as shown in FIG. 5.

Step S170 may enable users to visually align depth and RGB images by representing a depth map as a colored semi-transparent overlay on top of the RGB image (different colors corresponding to different depths); additionally or alternatively, depth and RGB images may be represented in any suitable manner (e.g., the depth map may be a patterned overlay, RGB/depth images may be represented using detected edges, etc.).

Step S170 may include allowing users to align depth and RGB images in any suitable way, including by scaling, rotating, skewing, translating, or by performing any other transformation. In some implementations, Step S170 includes accepting only limited feedback from a user (e.g., for simplicity's sake); for example, Step S170 may include allowing a user to translate the depth map in one axis only (relative to the RGB image).

Alignment of RGB and depth maps corresponds to particular registration parameters; once a user has aligned depth and RGB images, the transformation applied by the user (e.g., translation of the depth map along one axis) may be used to update registration parameters calculated by a primary (and/or secondary) autoregistration technique.

In a third embodiment, Step S170 may include any combination of performing manual registration and performing secondary autoregistration.

Step S170 is preferably performed after initially estimating registration parameters (and initial estimates are used as starting points for Step S170) but Step S170 may additionally or alternatively be performed at any suitable time (e.g., without previously estimated registration parameters in place).

Step S170 is preferably used as a final calibration step; that is, the user feedback (and/or secondary autoregistration technique) is used to set final values for the parameters supplemented by Step S170. Additionally or alternatively, Step S170 may be used as an initial or intermediate step; for example, user feedback may be used to provide rough alignment, while primary autoregistration techniques are used to further refine registration parameters.

Step S170 may be performed in response to any suitable condition. For example, Step S170 may always be performed for a particular registration parameter. As another example, Step S170 may be performed in response to certain environmental conditions (e.g., low light), capture system conditions (e.g., low battery level), and/or performance conditions (e.g., low parameter solution accuracy, lack of solution convergence, high sample requirement).

The methods of the preferred embodiment and variations thereof can be embodied and/or implemented at least in part as a machine configured to receive a computer-readable medium storing computer-readable instructions. The instructions are preferably executed by computer-executable components preferably integrated with a 3D imaging system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method comprising:
    capturing first 2D image data with a red-green-blue (RGB) camera of a 3D image capture system at a first time;
    capturing first depth data with a depth camera of the 3D image capture system at the first time;
    determining a first pose associated with the 3D image capture system at the first time;
    performing registration of the RGB camera to the depth camera based at least in part on the first pose;
    capturing second 2D image data with the RGB camera at a second time;
    capturing second depth data at the second time;
    determining a second pose associated with the 3D image capture system at the second time; and
    correcting the registration of the RGB camera to the depth camera based at least in part on the second pose.

2. The method of claim 1, wherein correcting the registration comprises:
    identifying a set of points common to the first depth and the second depth data;
    calculating a texture error function for the set of points; and
    updating the registration to reduce the texture error function.

3. The method of claim 2, wherein identifying the set of points common to the first depth data and the second depth data comprises identifying the set of points using an iterative closest point algorithm.

4. The method of claim 1, further comprising:
    identifying a set of points common to the first depth—and the second depth data;
    calculating a color/texture error function for the set of points;
    updating the registration to reduce the color/texture error function; and
    tracking motion of the 3D image capture system between the first pose and the second pose; and
    wherein identifying the set of points common to the first depth data and the second depth data comprises identifying the set of points by applying a rigid body transform based at least in part on the motion.

5. The method of claim 1, further comprising:
    tracking motion of the 3D image capture system between the first pose and the second pose;
    wherein capturing the second depth data comprises capturing depth data using a derived data technique; and
    wherein using the derived data technique comprises calculating the second depth data based at least in part on the first depth data.

6. The method of claim 1, wherein the second time is occurs after a threshold period of time has elapsed since the first time.

7. The method of claim 1, wherein updating the registration comprises performing bounded iterative linearization using, at least in part, the first 2D image data, the second 2D image data, the first depth data, the second depth data, the first pose, and the second pose.

8. The method of claim 1, further comprising:
    temporally synchronizing the RGB camera and the depth camera based at least in part on timing signals provided to the RGB camera and the depth camera; and
    causing the RGB camera to capture two frames for every frame captured by the depth camera.

9. The method of claim 1, wherein performing the registration of the RGB camera to the depth camera comprises performing the registration using an image feature detection technique.

10. The method of claim 1, further comprising:
    receiving user input corresponding to one or more registration parameters; and
    correcting the registration of the RGB camera to the depth camera based on at least in part on the user input.

11. The method of claim 10, wherein receiving user input comprises:
    displaying a depth map image overlaid on an RGB image on a display;
    enabling user alignment of the depth map image and the RGB image on the display; and
    measuring transformations resulting from the user alignment of the depth map image and the RGB image.

12. The method of claim 1, further comprising:
    identifying a set of points common to the first depth data and the second depth data;
    determining a color error function from the set of points; and
    updating the registration of the RGB camera to the depth camera to reduce misalignment between the RGB camera and the depth camera based at least in part on—the color error function.

13. A method comprising:
    capturing first 2D image data captured by a red-green-blue (RGB) camera at a first time;
    capturing first depth data captured by a depth camera at the first time;
    performing registration of the RGB camera to the depth camera based at least in part on motion data at the first time;
    receiving second 2D image data captured by the RGB camera at a second time;
    receiving second depth data captured by the depth camera at the second time;
    identifying a set of points common to the first depth data and the second depth data;
    determining a color error function from the set of points; and
    updating the registration of the RGB camera to the depth camera to reduce misalignment between the RGB camera and the depth camera based at least in part on—the color error function.

14. The method of claim 13, wherein the second depth data and the second 2D image data is captured in response to the motion data indicating a change in position of a system including the RGB camera and the depth camera.

15. The method of claim 13, wherein identifying the set of points common to the first depth data and the second depth data comprises identifying the set of points using an iterative closest point algorithm.

16. A method comprising:
receiving first 2D image data from a red-green-blue (RGB) camera of a three-dimensional (3D) system;
receiving first depth data from a depth camera, the first depth data and the first 2D image data captured at substantially a first time, the depth camera located on the 3D system at a location proximate to the RGB camera but different from the RGB camera;
determining a first pose associated with the 3D system at the first time;
performing registration of the RGB camera to the depth camera based at least in part on a comparison of the first 2D data to the first depth data;
receiving second 2D image data form the RGB camera;
receiving second depth data from the depth camera, the second depth data captured and the second 2D data captured at substantially a second time;
determining a second pose associated with the system at the second time; and
correcting the registration of the RGB camera to the depth camera based at least in part on the second pose, the second depth data, and the second 2D image data.

17. The method of claim 16, wherein correcting the registration comprises:
identifying a set of points common to the first depth—and the second depth data;
calculating a color error function for the set of points; and
updating the registration to reduce the color error function.

18. The method of claim 16, further comprising correcting the registration of the RGB camera to the depth camera based on at least in part on a user input.

19. The method of claim 16, wherein correcting the registration comprises:
identifying a set of points common to the first depth—and the second depth data;
calculating a texture error function for the set of points; and
updating the registration to reduce the texture error function.

20. The method of claim 16, wherein performing the registration of the RGB camera to the depth camera includes overlaying the depth data on the RGB image data.

* * * * *